United States Patent [19]

Devaney

[11] Patent Number: 4,594,662
[45] Date of Patent: Jun. 10, 1986

[54] DIFFRACTION TOMOGRAPHY SYSTEMS AND METHODS WITH FIXED DETECTOR ARRAYS

[75] Inventor: Anthony J. Devaney, Ridgefield, Conn.

[73] Assignee: Schlumberger Technology Corporation, New York, N.Y.

[21] Appl. No.: 533,391

[22] Filed: Sep. 19, 1983

Related U.S. Application Data

[63] Continuation-in-part of Ser. No. 441,323, Nov. 12, 1982.

[51] Int. Cl.$^4$ .................. G01V 5/00; G01N 29/00; G06F 15/42
[52] U.S. Cl. ............................ 364/400; 73/602; 128/660; 250/256; 364/414; 364/421; 364/422; 378/901
[58] Field of Search ............... 364/414, 420, 421, 422, 364/400; 73/602; 250/253, 256, 269; 128/660; 367/14; 378/4, 901

[56] References Cited

U.S. PATENT DOCUMENTS 4,214,226 7/1980 Narasimhan et al. ............... 181/102

OTHER PUBLICATIONS

Devaney, A. J., "A Filtered Backpropagation Algorithm for Diffraction Tomography", *Ultrasonic Imaging*, 4, 1982.
Adams, M. F. et al., "Synthetic Aperture Tomographic (SAT) Imaging for Microwave Diagnostics", *IEE Proceedings*, vol. 129, Part H, No. 2, Apr. 1982.
Devaney, A. J., "Inverse-Scattering Theory Within the Rytov Approximation", *Optics Letters*, vol. 6, No. 8, Aug. 1981.
Devaney, A. J., "A New Approach to Emission and Transmission CT", *1980 Ultrasonics Symposium Proceedings*, vol. 2, Nov. 1980.
Kaveh, M. et al., "A Comparison of Born and Rytov Approximations in Acoustic Tomography", *Acoustical Imaging*, vol. 2, ed. by John P. Powers, Plenum Press, NY, 1982.
Pan, S. X. et al., "A Computational Study of Reconstructive Algorithms for Diffraction Tomography: Interpolation Versus Filtered Backpropagation", *IEEE Trans. Acoust. Speech, Signal Processing*, vol. ASSP-31, No. 5, Oct. 1983, 1262-1275.
Norton, S. J. et al., "Ultrasonic Reflectivity Imaging in Three Dimensions: Exact Inverse Scattering Solutions for Plane, Cylindrical, and Spherical Apertures," *IEEE Transactions on Biomedical Engineering*, vol. BME-28, No. 2, Feb. 1981, 202-220.
Fercher, A. F. et al., "Image Formation by Inversion of Scattered Data Field: Experiments and Computational Simulation, " *Applied Optics*, vol. 18, No. 14, Jul. 15, 1979, 2427-31.
Mueller, R. K. et al., "Reconstructive Tomography and Applications to Ultrasonics," *Proceedings of the IEEE*, vol. 67, No. 4, Apr. 1979, 567-587.

*Primary Examiner*—Jerry Smith
*Assistant Examiner*—Clark A. Jablon
*Attorney, Agent, or Firm*—David P. Gordon; Stephen L. Borst

[57] ABSTRACT

Diffraction tomography systems and methods are disclosed for the reconstruction of physical properties of two- and three-dimensional objects from information collected by detector arrays which are fixed in space. Improved preprocessing procedures and an optimal filtered backpropagation technique are disclosed for both geophysical and ultrasonic diffraction tomography systems and methods. A novel method for reconstructing properties of three-dimensional objects and slices thereof in real time is also disclosed. An optimal filtered backpropagation technique for the backscatter mode is further disclosed.

28 Claims, 8 Drawing Figures

DIFFRACTION TOMOGRAPHY SYSTEMS AND METHODS WITH FIXED DETECTOR ARRAYS

A continuation-in-part of co-pending application Ser. No. 441,323 entitled "Diffraction Tomography Systems and Methods", filed on Nov. 12, 1982. The entire text of Ser. No. 441,323 is hereby incorporated by reference herein.

BACKGROUND

For purposes of this application and the claims herein, the term "backpropagation" shall be defined to mean that operation that is the inverse or approximate inverse of a forward propagation process. The term "filtered backpropagation technique" shall be defined to describe any diffraction tomographic technique for the partial or complete reconstruction of an object where a filtered real or complex amplitude and/or filtered real or complex phase of a wave is backpropagated into the object space; i.e., is propagated back into object space according to the inverse or approximate inverse of the way in which the wave was originally diffracted. The filtered backpropagation technique is usually implemented in the form of a convolution of filters. For purposes of brevity, such an implementation will identically be called the filtered backpropagation technique. A "backpropagation filter" shall be defined to describe that filter of the filtered backpropagation technique which accounts for diffraction in the backpropagation of the phase; e.g. in ultrasound diffraction tomography, the filter of the filtered backpropagation technique which is not the standard X-ray tomographic filter (or a variation thereon). A "filtered backpropagation operation" shall be defined as any procedure which employs the filtered backpropagation technique. Also, for purposes of this application, one-dimensional fixed detector array shall be defined to include both an array of detectors on a fixed line, and one detector scanned over a fixed line, or any equivalent thereof. A two-dimensional fixed detector array shall include one detector scanned over a fixed plane, an array of detectors on a line scanned over a fixed plane, or a two-dimensional array of detectors on a fixed plane, or any equivalent thereof.

Further, for purposes of this application and claims herein, it should be understood that the waves of eneregy which propagate and diffract according to the invention include but are not limited to sonic or electromagnetic waves. The term "sonic wave" shall be interpreted as broadly as possible and shall be understood to include all elastic wave phenomena in liquid and solid materials including, but not limited to, acoutic, compressional, shear, and elastic waves. The term "acoutic wave" shall be interpreted herein to be the equivalent of "sonic wave". The term "electromagnetic wave" shall also be interpreted in its broadest sense and shall include, but not be limited to infrared rays, X-rays, and the class known as "optics".

This invention relates to systems and methods for reconstructing acoustic and/or electromagnetic properties of two or three-dimensional objects using diffraction tomographic procedures wherein the detector array of the system is located on a plane or line fixed in space. An example of such a system is disclosed in copending Ser. No. 441,323 with regards to the geophysical diffraction tomography embodiments discussed therein. While systems and methods for geophysical diffraction tomography were described therein, and those disclosed systems and methods utilized a filtered backpropagation technique (as defined in Ser. No. 441,323 and identically defined herein), the filtered backpropagation technique and the preprocessing disclosed herein should be preferable to those previously disclosed.

While certain standard conventional ultrasound imaging systems employ fixed detection arrays, those systems do not incorporate a backpropagation filter or a filtered backpropagation technique. Conversely, while in copending Ser. No. 441,323, there is a detailed description of a filtered backpropagation technique, there is no detailed discussion on how to tailor the backpropagation filter and filtered backpropagation technique for use with a fixed detector array for ultrasound diffraction tomography, for either two-dimensional or three-dimensional objects. The advantages of a fixed detector array reconstruction system are numerous and desirable, but until now have not been obtained in a high-resolution ultrasonic tomography system.

The use of backscatter information in imaging is also known. Standard pulse echo systems often use the same transducer arrays as both transmitters and receivers. (See, for example, U.S. Pat. No. 4,258,576 to Vilkomerson et al., U.S. Pat. No. 4,381,787 to Hottinger and U.S. Pat. No. 4,248,091 to Hashiguchi.) Again, however, there has been no disclosure in either Ser. No. 441,323 or in the prior art which tailors the use of a filtered backpropagation technique to optimize it for backscatter information. Those skilled in the art will appreciate that the backscatter situation is just a special case of the broader fixed detector array embodiment because in backscatter, the detector array is fixed to be along the same line or plane as the sources. Nevertheless, the filtered backpropagation technique must be altered in some backscatter situations to optimally process the backscatter information.

SUMMARY

It is therefore an object of the present invention to provide an optimal backpropagation filter and filtered backpropagation technique for geophysical diffraction tomography embodiments and the proper preprocessing for such system and method embodiments.

It is another object of the present invention to provide a filtered backpropagation technique for ultrasonic diffraction tomography for the reconstruction of two- and three-dimensional objects using systems having a fixed detector array.

It is yet another object of this invention to provide a filtered backpropagation technique which uses backscatter information to provide reconstructions of two- and three-dimensional objects.

In accordance with the objects of the present invention, a diffraction tomographic system with a fixed detector array is broadly comprised of a continuous or pulsed source of wave energy, an array of detectors fixed in space (fixed detector array) for the measurement of the amplitude and/or phase of the diffracted field resulting from the wave of energy interacting with an object, a preprocessing system for putting the information into a form suitable for filtering, and a filtering system for processing the measured information according to a filtered backpropagation technique to thereby generate arrays which are used to reconstruct properties of the object. The wave energy provided may be in the form of plane, spherical or cylindrical waves. The filtering system disclosed may include a means for implementing a filtered backpropagation technique and thereby performing a partial reconstruction of the object from limited information, means for integrating a number of the partial reconstructions so as to obtain as complete a reconstruction as possible from all available information, and means for displaying the reconstruction.

According to the fixed detector array geophysical tomographic embodiments of the invention, a linear, one-dimensional receiver array is aligned on the x axis (in the borehole). Acoustic sources, as are typically used in subsurface seismic exploration, are arranged on the surface so as to provide plane or cylindrical waves, or equivalents thereto. These waves interact with the geophysical formation and are detected by the detectors of the receiver array. In response thereto, the detectors produce analog electrical signals which are converted to digital signals and, if necessary, processed in such a way as to obtain the signal that would have been detected if the transmitted wave were a continuous cylindrical waveform having a linear phase shift along the transmitter axis. This processed signal is complex phase converted and phase unwrapped and is then further preprocessed by a scaling and phase corrector which corrects the unwrapped complex phase signal by adding a reference phase subtraction factor, an angular scaling multiplication factor, and a scaling factor.

The phase and scale corrected unwrapped complex phase is input to the means implementing a filtered backpropagation technique. Due to the fact that the preprocessing is different than that disclosed in Ser. No. 441,323 (by the addition of the phase and scale corrector), the details of the optimal filtered backpropagation technique are altered. The optimal filtered backpropagation technique is still comprised of a stationary filter convolved with a backpropagation filter, but the backpropagation filter is changed to account for the different preprocessing. In some cases, the stationary filter must also be changed depending on the angles of incidence of the insonifying waves.

Following the filtered backpropagation operation, the partial image array which results therefrom is transferred to a master image array which may be displayed by suitable means and the entire sequence of steps is repeated for a different choice of linear phase shift. Because the receiver array is fixed in space, no rotational interpolation is required in the transfer from the partial image array to the master image array, and the partial image arrays may be added (simple interpolation) one to the other on the master image array. The final two-dimensional reconstruction obtained is a rendition of the electromagnetic or acoustic complex profile of the formation lying between the borehole and the surface.

While the above summary was discussed with regard to an offset vertical seismic profiling arrangement, similar preprocessing and a similar filtered backpropagation technique is used for borehole-to-borehole acoustic and electromagnetic tomography procedures.

A second set of embodiments disclosed herein relates to the use of a fixed detector array in ultrasound tomography which is useful in medical imaging as well as non-destructive material testing and evaluation. The advantages of a fixed array for medical tomography are clear to those skilled in the art: Firstly, it is rather cumbersome to move detector arrays. Secondly, and possibly more importantly, there often may be no freedom to move the array completely around the object for which a reconstruction is desired.

The sources for a fixed detector array ultrasound tomography system may comprise a point source which simulates a plane wave and moves around the object to provide different angles of incidence with the object, or a phased array of sources which simulates a plane or cylindrical wave and is capable of providing different angles of incidence by changing the linear phase shift along the transmitter axis. In either case, for a two-dimensional object, the ultrasound tomography system is in many ways identical to the geophysical diffraction tomography system with a fixed detector array as disclosed herein. Indeed, those skilled in the art will recognize that there are few differences between the embodiments. Those differences however do include a difference in the frequency (e.g. ultrasound versus sonics) of the source. Also, due to the differences in signal/noise ratios, standard seismic signal enhancing techniques are beneficially used in the geophysical diffraction tomography system.

Reconstructions of three-dimensional objects may also be obtained using a system with a fixed detector array. Two methods are available for reconstructing such profiles. The first method is an extension of that which was disclosed in copending Ser. No. 441,323. In particular, a two-dimensional detector array is used to provide information and the unwrapped complex phase of the detected information is arrived at exactly in the manner disclosed in Ser. No. 441,323. Line projections of the unwrapped phase are then obtained and the line projections are further preprocessed according to the phase and scale correction factors discussed above with regard to the geophysical embodiments and are then processed using the same filtered backpropagation technique as used in the geophysical fixed detector array system disclosed herein.

The second procedure for yielding three-dimensional reconstructions may also be employed to conveniently generate reconstructions of two-dimensional sections of the object profile. A two-dimensional detector array is arranged as described in Ser. No. 441,323. The object is insonified with plane waves having various directions of propagation (view angles and planar orientations). The signals output from the detector array for any given incident plane wave are preprocessed exactly as suggested in Ser. No. 441,323 up to and including the phase unwrapping. The preprocessed signals are then further preprocessed according to a three-dimensional generalization of the phase and scale corrector disclosed with regard to the geophysical tomography embodiment herein. Finally, the preprocessed signals are processed according to a three-dimensional generalization of the filtered backpropagation technique disclosed with regard to the geophysical tomographic embodiment herein. More specifically, in the three-dimensional generalization of the filtered backpropagation technique, the stationary filter is optimally selected depending on the incident wave vectors generating the data. The backpropagation filter is altered to account for the additional preprocessing. In this manner, a three-dimensional reconstruction of the object may be gained with a fixed detector array and plane wave insonification (or a plane wave simulation by the slant stacking of point source responses). A section of the three-dimensional object may be reconstructed using the same preprocessing and filtered backpropagation technique of the three-dimensional reconstruction method described but by only reconstructing the object over one specific plane. This technique speeds up the processing time considerably.

A third set of embodiments of the present invention involves diffraction tomography methods and systems with a fixed detector array in a backscatter mode. The backscatter mode may be used in both the ultrasound and geophysical applications, as it is just a limited case of a fixed detector array where the array is on the same plane or line as the sources. In fact, in acoustics, the same set of transducers may be used as both transmitters and receivers. The techniques used for backscatter diffraction tomography are the same as those discussed above with regard to two- and three-dimensional ultrasonic fixed detection array ultrasound tomography and the geophysical fixed detection array diffraction tomography. However, the best mode for backscatter diffraction tomography uses the Born approximation instead of the Rytov approximation, as the Born approximation is believed to be better in these circumstances. Nevertheless, it will be understood that both the Born or Rytov approximations are encompassed by the invention and either may be used separately or in combination in either the backscatter diffraction tomography or the other fixed array detection tomography embodiments summarized above.

The advantages of backscatter diffraction tomography are numerous. In the geophysical tomography applications, boreholes are not always present. Since backscatter diffraction tomography may be viewed simply as a surface seismics technique, it is clearly much less expensive than tomography using vertical seismic profiling techniques. For the ultrasonic applications, the filtered backpropagation technique for backscatter diffraction tomography is simply adaptable to existing standard conventional imaging systems, e.g. pulse echo systems known and used in the art.

BRIEF DESCRIPTION OF THE DRAWINGS

The present invention may be better understood and its numerous objects and advantages will become apparent to those skilled in the art by reference to the detailed description of the preferred embodiments and by reference to the drawings wherein.

DETAILED DESCRIPTION

FIXED DETECTOR ARRAY GEOPHYSICAL TOMOGRAPHY

Figure 1:
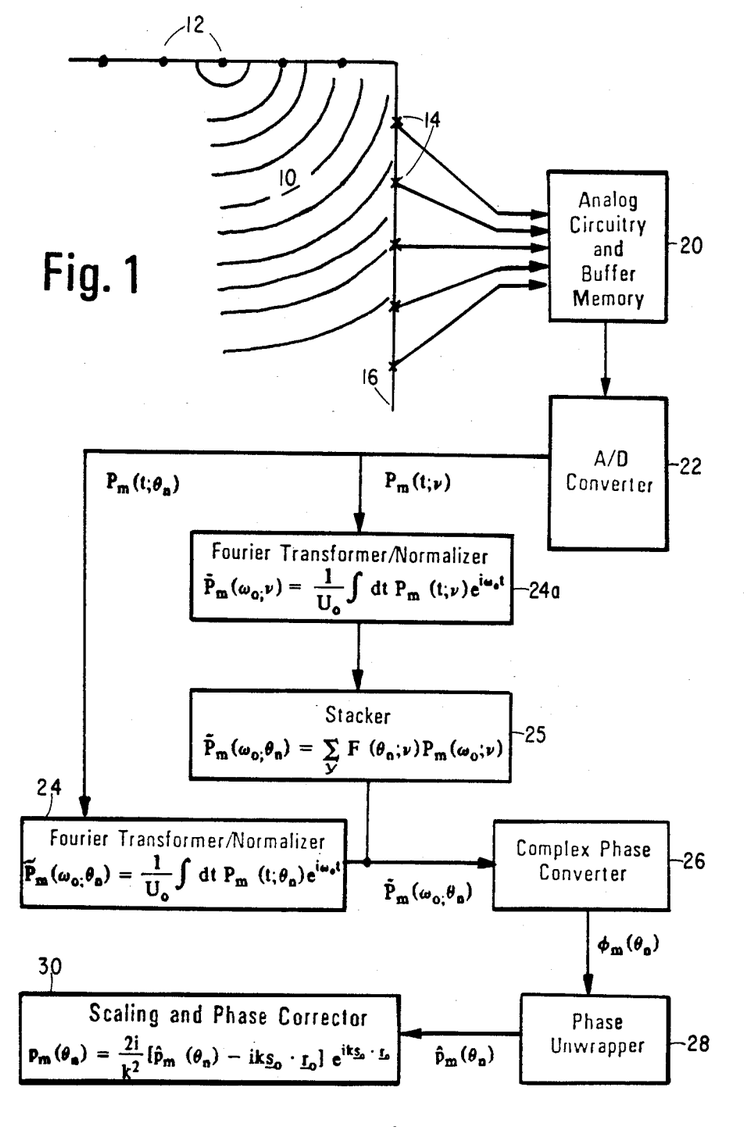
FIG. 1 is a partially schematic and partially block diagram of the preprocessing performed on detected signals for a fixed detector array geophysical diffraction tomographic system for two-dimensional reconstructions.

Turning to FIG. 1, a best mode embodiment for a one-dimensional fixed detector array diffraction tomography system may be seen. FIG. 1 represents an embodiment for a geophysical formation 10 using sources 12 on the surface, and detectors 14 in borehole 16. It should be understood that the shown embodiment is intended to apply also to those situations where the detector and source locations are reversed, as well as to well-to-well tomography and well to surface to well tomography.

As seen in FIG. 1, sources 12 may be arranged on the surface of the formation 10. The sources 12 are typically electromagnetic or sonic energy sources and may be considered to be sources of spherical waves as the sources are in contact with the formation (body) 10. By properly aligning and pulsing these sources, sources 12 can be used to approximate either cylindrical or plane waves. Thus, a slant stacking of a one-dimensional array of spherical waves will produce a cylindrical wave. Likewise, a slant stacking of cylindrical waves, or a slant stacking of a two-dimensional array of spherical waves approximates a plane wave. While for purposes of this geophysical diffraction tomography discussion plane waves are not considered, they are considered for the ultrasonic fixed array diffraction tomography discussion hereinafter. Those skilled in the art will understand that the slightly different preprocessing used in both cases could easily be made to apply to the other set of embodiments.

According to the geophysical diffraction tomography embodiments, sources 12 may be considered to be preferably pulsed in either of two manners: sequentially; or pulsed together with a variable phase delay between adjacent transmitters 12. In both cases, the electromagnetic or sonic energy pulse interacts with formation 10 and is detected by a fixed array of detector elements 14 which are located in borehole 16. The signals detected at the m'th detector or detector position (m=1, 2, ..., $N_m$) for the wave transmitted from the $\nu$'th transmitter or transmitter position ($\nu=1, 2, ..., N_\nu$) are denoted for the sequentially-pulsed case as $P_m$ (t;$\nu$); and for the phase delayed case as $P_m$ (t;$\theta_n$) wherein $\theta_n$ is the phase tilt of the transmitted wave. In other words, $\theta_n$ is defined as the angle made by the unit normal vector s0 of the cylindrical wavefront with the positive z (surface) axis as is illustrated in FIG. 13 of Ser. No. 441,323 copending herewith.

In the embodiment of the present invention where the sources are pulsed together with a variable phase delay, the detected signals are processed and stored at 20, and A-D converted at 22. The digitized detected signals $P_m(t; \theta_n)$ are then Fourier transformed in time and normalized at 24 to yield $\tilde{P}_m(\omega_o, \theta_n)$ according to the equation $$\tilde{P}_m(\omega_o; \theta_n) = \frac{1}{U_o} \int dt\, P_m(t;\theta_n) e^{i\omega_o t} \qquad (1)$$

where $U_o$ is the amplitude of the insonifying cylindrical pulse at its center frequency $f_o$ and $\omega_o = 2\pi f_o$ is the center frequency in radians/second.

When the sources are sequentially pulsed instead of being pulsed with a variable phase delay, the detected signals are likewise processed, stored and A-D converted at 20 and 22. The digitized signals are then Fourier transformed in time and normalized at 24a to generate $\tilde{P}_m(\omega_o; \nu)$ and the transformed signal is slant stacked at stacker 25 as is well known in the geophysical arts. The signals $\tilde{P}_m(\omega_o; \nu)$ are preferably stacked so as to simulate the signal that would be received at the m'th detector if a cylindrical wave had been transmitted (i.e., to simulate $\tilde{P}_m(\omega_o;\theta_n)$). Thus, the response of a cylindrical wave is artificially generated by stacking the received signal data. The stacker 25 uses a well-known stacking filter $F(\theta_n, \nu)$ where $\theta_n$ is the phase tilt of the transmitted signal as defined above. Stacker 25 thus generates $\tilde{P}_m(\omega_o;\theta_n)$ which is the same signal generated by the phase delayed array.

After $\tilde{P}_m(\omega_o;\theta_n)$ is derived, the principle value complex phase $\phi_m(\theta_n)$ of $P_m(\omega_o;\theta_n)$ is calculated at 26 using the relations $$\text{Real } \phi_m(\theta_n) = \log_e |\tilde{P}_m(\omega_o; \theta_n)| \qquad (2a)$$

$$\text{Imag } \phi_m(\theta_n) = \text{Arc Tan} \left[ \frac{\text{Imag } \tilde{P}_m(\omega_o; \theta_n)}{\text{Real } \tilde{P}_m(\omega_o; \theta_n)} \right] \qquad (2b)$$

The principle valued complex phase array $\theta_m(\theta_n)$ is then phase unwrapped to yield the unwrapped complex phase array $\hat{P}_m(\theta_n)$ as indicated at 28.

In the situation where the pulse duration of the insonifying pulse is very short, the unwrapped complex phase array $\hat{P}_m(\theta_n)$ is approximately determined by means of the following relations:

$$\text{Real } \hat{p}_m(\theta_n) = \log_e A_m(\theta_n), \qquad (3a)$$
$$\text{Imag } \hat{p}_m(\theta_n) = \omega_o \zeta_m(\theta_n). \qquad (3b)$$

In these relationships, $A_m(\theta_n)$ and $\zeta_m(\theta_n)$ are, respectively, the amplitude and total delay time between the pulse received at the m'th detector and the transmitted pulse. The relations (3a) and (3b) can also be used as a first estimate of the unwrapped phase in a phase unwrapping algorithm.

Yet another embodiment applies when the Born approximation is employed. In this case, the array $\hat{P}_m(\theta_n)$ is calculated using the equations $$\hat{p}_m(\theta_n) = e^{-x} \hat{P}_m(\omega_o; \theta_n + x) - 1 \qquad (4)$$

where $\chi$ is the phase of the insonifying cylindrical wave along the measurement line. The unwrapped complex phase array $\hat{P}_m(\theta_n)$ obtained by any of the above three embodiments is then further preprocessed to account for the angular nature of the input information, and the results are then input into a filtering system which will be described hereinafter.

As aforementioned, after the complex phase array $\phi_m(\theta_n)$ has been unwrapped at 28, the unwrapped complex phase array $\hat{P}_m(\theta_n)$ is further preprocessed. This additional preprocessing accounts for the fact that because the detector array is fixed in space, the information being received by detectors 14 does not arrive in a generally perpendicular fashion. The additional preprocessing adds a reference phase subtraction factor as well as angular-dependent and constant scaling factors which were not disclosed in copending Ser. No. 441,323. Thus, the complex phase array $\hat{p}_m(\theta_n)$ is sent through scaling and phase corrector 30 which processes array $\hat{p}_m(\theta_n)$ according to $$p_m(\theta_n) = \frac{2i}{k^2} [\hat{p}_m(\theta_n) - iks_0 \cdot r_0] e^{iks_0 \cdot r_0} \qquad (5)$$

where $iks_0 \cdot r_0$ is the reference phase, with $s_0 \cdot r_0$ equalling $l_o$ (as defined in Ser. No. 441,323) at $\theta_0 = 0$, and where $e^{iks_0 \cdot r_0}$ is the angular-dependent scaling factor while $2i/k^2$ is a constant scaling factor at wavenumber $k$ and $-iks_0 \cdot r_0$ is the reference phase subtraction factor.

Figure 2:
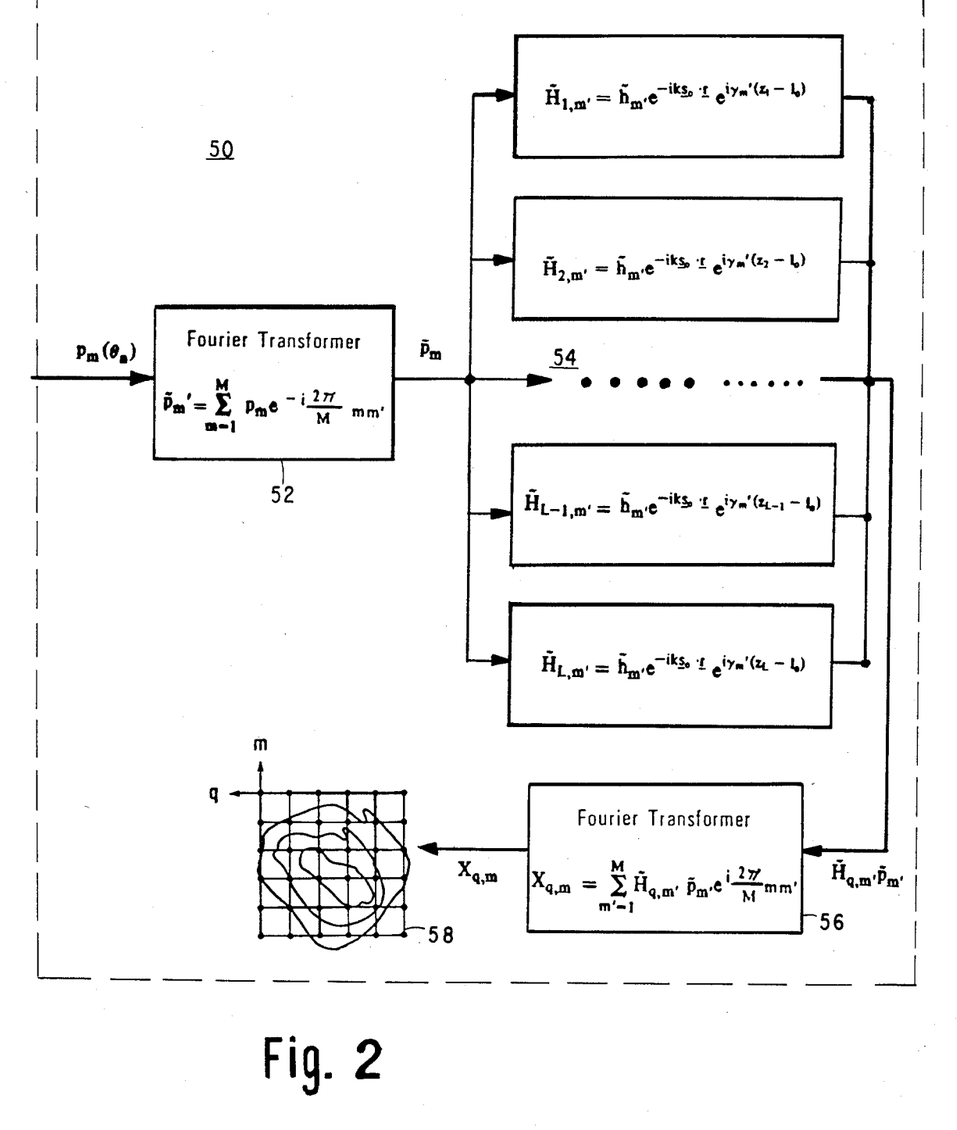
FIG. 2 is a block diagram of the preferred filtered backpropagation technique for a fixed detector array diffraction tomographic system for two-dimensional object reconstructions.

In the system 50 of the fixed detector array geophysical embodiments, after Fourier transformation at 52, the unwrapped phase array $p_m(\theta_n)$ must be filtered as seen in FIG. 2 using a filtered backpropagation technique $\tilde{H}_{qm'} = \tilde{h}_{m'} \tilde{\Gamma}_{qm'}$ where optimally $$\tilde{h}_{m'} = \left| k \frac{m'}{M} \cos\theta_n - \gamma_{m'} \sin\theta_n \right| \qquad (6)$$

$$\tilde{\Gamma}_{qm'} = e^{-iks_0 \cdot r} e^{i\gamma_{m'}(z_q - l_o)} \qquad (7)$$

with $$\gamma_{m'} = k\sqrt{1 - \left(\frac{m'}{M}\right)^2}$$

where $M$ is the number of detectors in the detecting array. As disclosed in copending U.S. application Ser. No. 441,323, the convolutional (stationary) deblurring filter $\tilde{h}_{m'}$ is not the standard X-ray deblurring filter, but depends explicitly on the tilt angle $\theta_n$ of the insonifying cylindrical wave. Also, the backpropagation filter, $\tilde{\Gamma}_{qm'}$, depends on $$s_0 \Gamma = \cos\theta_n z_q + \sin\theta_n x_m \qquad (8)$$

where $z_q = q\delta z$ and $x_m = m\delta x$ are the (z, x) coordinates associated with the q, m sample point in the image array. However, for the special case where $\theta_n = 0$, corresponding to the measurement line being perpendicular to the unit wavevector $s_0$, the filters $\tilde{h}_{m'}$ and $\tilde{\Gamma}_{qm'}$ reduce to those of the ultrasound diffraction tomography embodiment of the Ser. No. 441,323 invention.

After the signals have undergone the filtering and backpropagation in a filter bank 54 in system 50, the signals are inverse Fourier transformed 56 and interpolated (without rotation) onto a master image array 58. The master array may be displayed as desired.

By pulsing the sources 12 at a single determined tilt, and detecting the produced fields with detectors 14 along the borehole axis 16 for the entire area of interest, a partial reconstruction profile of the subsurface formation may be created. In order to reconstruct a more complete profile of the subsurface formation, the sources 12 must be pulsed at phase tilts covering an entire range of 0 to $-\pi$, wherein the signals for each tilt when separately processed provide a partial reconstruction of the subsurface formation. As those skilled in the art will recognize, a phase tilt of $-\pi/2$ causes the cylindrical wave formed by the spherical waves to propagate straight down into the formation. A phase tilt of 0 causes the wave to propagate toward the borehole in a manner parallel to the surface. The range of phase tilts between 0 and $-\pi$ causes waves entering the formation to propagate at different angles. Thus, for each different angle, another partial reconstruction is provided, and the interpolation of those reconstructions onto a master array provides a more complete two-dimensional reconstruction of the subsurface formation.

In order to optimally perform the reconstruction, however, the filtered backpropagation technique must be slightly altered between the angles of $-\pi < \theta < -90/2$. At those angles, the system is in backscatter mode (as discussed hereinafter) and the convolutional filter $\tilde{h}_{m'}$ must be changed to be optimal such that $$\tilde{h}_{m'} = \left| k \frac{m'}{M} \cos \theta_n - \gamma_{m'} \sin \theta_n \right| \left[ 1 - S\left( k \frac{m'}{M} - k \sin \theta_n \right) \right] \quad (9)$$

where S is a step function, i.e. $S(x)=1$ if $x \geq 0$ and $S(x)=0$ otherwise. The step function is utilized to avoid double coverage in Fourier transform (K) space.

The invention also envisions having the location of the sources 12 and the detectors 14 reversed from the discussed embodiment of FIG. 1. The preprocessing and the filtering remain identical. If one source is used, however, the source 12 may be moved in the borehole according to well-known techniques. The detectors 14 may be placed on the surface of the formation or they may be buried slightly under the formation surface as desired. Of course, the phase tilts in this situation can cover a range from $-\pi/2$ to $\pi/2$ ($-3\pi/2$).

In the borehole to borehole embodiment of the invention, sources 12 are located in one or more boreholes while detectors 14 are also located in one or more boreholes or wells. As was the case with the two other geophysical embodiments, the sources may be pulsed with a phase tilt or in a sequential fashion. The preprocessing and the filtered backpropagation technique are identical to the other geophysical cases. In the borehole to borehole (well to well) embodiment, the phase tilts of the propagating waves range from $\pi/2$ to $-90/2$, thereby providing a reconstruction of the formation profile without using backscatter information. In fact, as those skilled in the art will appreciate, if both sources and detectors are placed in both boreholes, a full two-dimensional reconstruction of the formation profile may be obtained.

The best mode embodiments of the methods for reconstructing profiles of subsurface formations are integrally connected with the systems. Thus, at least one wave of electromagnetic or sonic energy is directed at a phase tilt into the formation being investigated. The one or more fields produced by the waves are detected as a function of time and signals representative thereof are produced. The produced signals are preprocessed by calibrating, storing, A/D converting, Fourier transforming, normalizing, stacking (if necessary), and scaling and phase correcting. The preprocessed signals are then Fourier transformed and filtered by a filtered backpropagation technique which includes a stationary deblurring filter and a backpropagation filter, both of which depend on phase tilt angle. After another Fourier transformation, the resulting array is a partial reconstruction of the subsurface formation profile. By repeating the steps at different phase tilts and adding the resulting arrays onto a master array, a more complete reconstruction may be obtained.

Those skilled in the art will recognize that the methods and systems of the instant invention are closely related and that many permutations and variations may be made in both the methods and systems disclosed for the geophysical embodiments. For example, not only may detectors and sources be placed in one or more boreholes in the borehole to borehole embodiment, but sources and/or detectors may also be placed on the formation surface. It will be appreciated that if sources are placed on the surface and only detectors are placed in the two boreholes, a 0 to $-\pi$ range of phase tilts may be covered, and the reconstruction profile of the formation might be quite adequate. In this manner, the problems associated with locating sources in the borehole can be avoided. In any event, the disclosed embodiments are by way of example only and are not intended to limit the invention in any manner.

FIXED DETECTOR ARRAY ULTRASONIC DIFFRACTION TOMOGRAPHY

The same preprocessing and filtered backpropagation technique disclosed herein with reference to the fixed detector array geophysical tomography embodiments can be utilized for two-dimensional reconstructions in fixed detector array ultrasonic diffraction tomography. Ultrasonic diffraction tomography as described in copending Ser. No. 441,323 utilizes one or more ultrasonic sources which direct a wave of ultrasonic energy into a body being examined. After the insonifying wave interacts with the object, the resulting diffracted field is detected by one or more detectors. In the present invention, the ultrasonic sources may comprise a stationary array of sources repetitively pulsed either sequentially or with a variable phase delay so as to simulate a cylindrical wave propagating at different phase tilts, or a single source which simulates a plane wave which may be rotated around the object to provide different angles of insonification. In either case, for a two-dimensional reconstruction, the detectors comprise either a single detector scanned over a fixed line or a one-dimensional array of detectors located on a fixed line. If the stationary array of sources is used, i.e. cylindrical wave, the object reconstruction process is equivalent to that disclosed above with regard to the fixed detector array geophysical tomographic embodiments, and the preprocessing and filtered backpropagation technique shown in FIGS. 1 and 2 and described above are identically utilized. If a single source (plane wave) is used and rotated about the object as suggested by FIG. 3, the preprocessing and filtered backpropagation technique used is similar to that disclosed with regard to the ultrasonic tomography embodiments disclosed in Ser. No. 441,323, except that as disclosed with regard to the geophysical tomographic embodiments herein, an additional scaling and phase corrector is added to the preprocessing, while the filters of the filtered backpropagation technique are altered to account for the angles of insonification and changes to the preprocessing.

Figure 3:
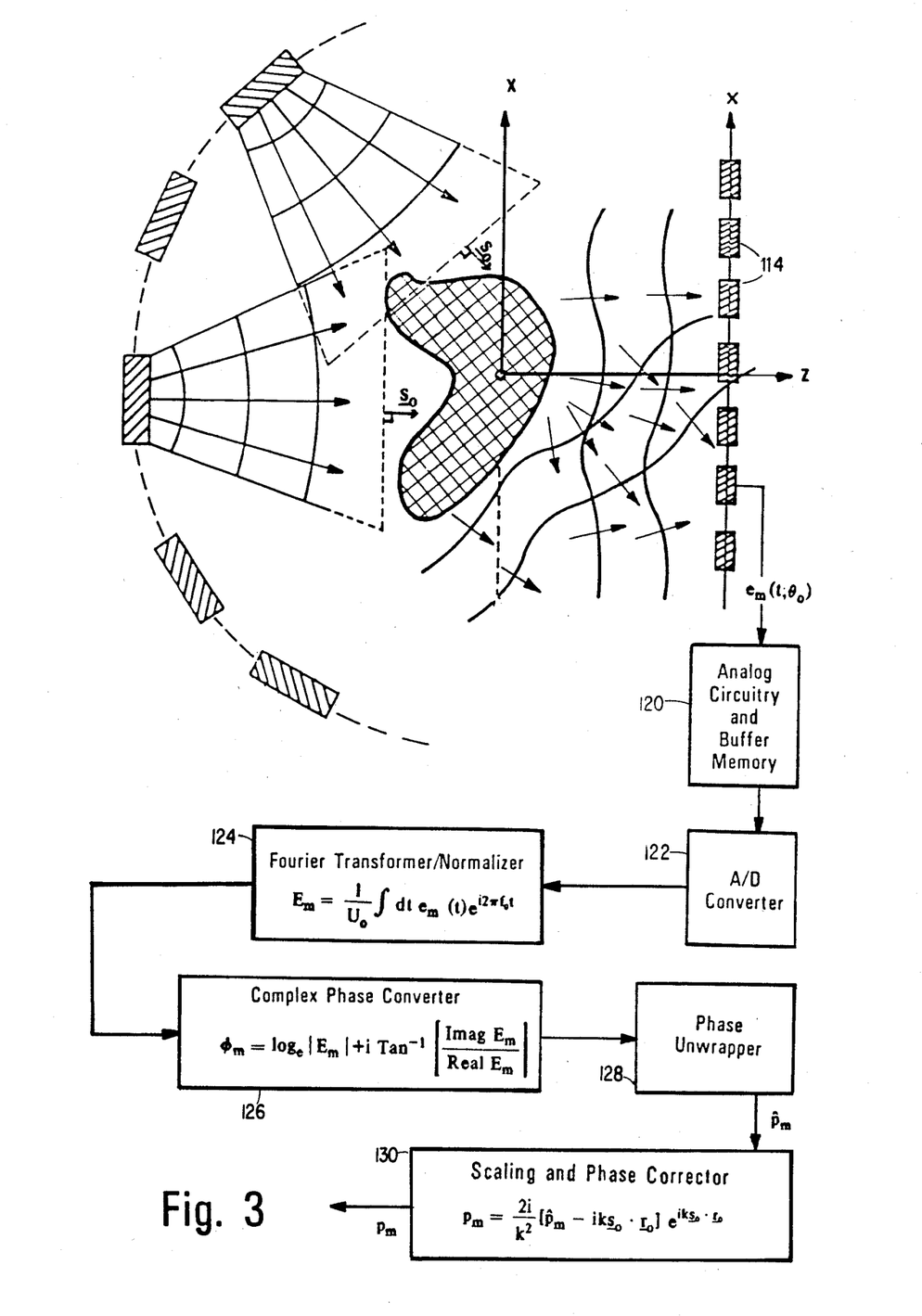
FIG. 3 is a partially schematic and partially block diagram of the preprocessing performed on detected signals for one embodiment of a fixed detector array ultrasonic diffraction tomographic system for two-dimensional reconstructions.

The preprocessing subsystem for such a fixed detector array single moving source ultrasonic diffraction tomographic system is seen in FIG. 3. Each detector 114 outputs a single signal $e_m(t;\theta_0)$ where $\theta_0$ is the angle made by the unit normal vector $s_0$ of the incident plane wave with the positive z axis (i.e. perpendicular to the detector array). The output signals are preprocessed by inputting them, if required or desired, into analog electronic circuitry and a buffer storage means 120 for prefiltering, calibration and temporarily storing the analog electrical signals in preparation for analog to digital conversion. A/D converter 122 converts the stored analog signals into digital format. In one embodiment of the present invention, the digitized electrical signals are then Fourier transformed in time and normalized by suitable means 124 according to the equation $$E_m = \frac{1}{U_o} \int dt e_m(t) e^{i2\pi f_o t} \tag{10}$$

where $U_o$ is the amplitude of the insonifying wave at its center frequency $f_o$.

After transformation and normalization, electrical output signals $E_m$ are further preprocessed by converting them to a complex phase $\phi_m$ by suitable means 126 according to the following operations:

$$\text{Real } \phi_m = \log_e |E_m| \tag{11a}$$

$$\text{Imag } \phi_m = \text{Arc Tan} \left[ \frac{\text{Imag } E_m}{\text{Real } E_m} \right] \tag{11b}$$

where the principle value of the arc tangent is computed. For each value of m, the quantity $\phi_m$ represents the principle value of the complex phase of the pressure field at frequency $f_o$ at the spatial position of the m'th detector element. Thus, the complex phase converter 126 manipulates the incoming data so that the amplitude information is contained in Real $\phi_m$ and the phase shift is found in Imag $\phi_m$.

After the electrical signals are converted into complex phases $\phi_m$, these complex phases are phase unwrapped at 128 and the unwrapped phase array $\hat{p}_m$ is further preprocessed by input into scaling and phase corrector 130 before the preprocessed signal may be used to perform an optimal partial reconstruction of the object.

Scaling and phase corrector 130, as with its counterpart in the geophysical tomography embodiments disclosed herein, accounts for the fact that a fixed detector array is not generally perpendicular to the propagation of the incident waves. In other words, in the ultrasonic tomography embodiments disclosed in copending application Ser. No. 441,323, the source and detectors were always aligned in a parallel fashion such that the direction of propagation of the waves was generally perpendicular to the detector array. This added constraint, as those skilled in the art will recognize, permitted the preprocessing to be simplified.

The additional preprocessing performed by scaling and phase corrector 130 adds a reference phase subtraction factor as well as angular dependent and constant scaling factors which were not disclosed in copending Ser. No. 441,323. Thus, the unwrapped complex phase array $\hat{p}_m$ is processed according to $$\hat{p}_m = \frac{2i}{k^2} [p_m - iks_0 \cdot r_0] e^{iks_0 \cdot r_0} \tag{12}$$

where $iks_0 \cdot r_0$ is the reference phase, with $s_0 \cdot r_0$ equalling $l_o$ at an incidence angle $\theta_0 = 0$ and where $e^{iks_0 \cdot r_0}$ is the angular dependent scaling factor while $2i/k^2$ is a constant scaling factor at wavenumber k and $-iks_0 \cdot r_0$ is the reference phase subtraction factor.

Of course, before the additional preprocessing done by scaling and phase corrector 130, the signal $e_m(t;\theta_0)$ may be preprocessed in different manners depending on the circumstances, as disclosed in copending U.S. Ser. No. 441,323. Thus, where the pulse duration of the insonifying plane wave is very short, the electrical signals $e_m(t;\theta_0)$ from the detector array are processed and stored at 120, A/D converted at 122 and then input into a preprocessing system which may utilize software to estimate the total delay time $\zeta_m$ between the pulse received at the detector and the transmitted pulse. The peak amplitude of the received pulse $A_m$ is also estimated.

After $\zeta_m$ and $A_m$ are estimated, the unwrapped complex phase $\hat{p}_m$ is approximately determined via the relationships $$\text{Real } \hat{p}_m = \log_e A_m, \tag{13a}$$

$$\text{Imag } \hat{p}_m = \omega_0 \zeta_m. \tag{13b}$$

where $\omega_o = 2\pi_0 f_o$ is the center frequency of the insonifying pulse. The above two relationships are only approximate but, nevertheless, provide good approximations in cases where the total pulse duration is very short. In addition, the approximation obtained for Imag $p_m$ can be used, if desired, to aid in the phase unwrapping operation 128 required in the embodiment discussed above.

Yet another manner of preprocessing signals $e_m(t;\theta_0)$ concerns cases where the Born approximation for the interaction between the insonifying wave and object is employed. For such cases, the normalized Fourier transformed transducer output signals $E_m$ are processed according to the equation $$\hat{p}_m = e^{-x} \chi_m + x - 1 \tag{14}$$

where $\chi$ is the phase of the insonifying plane wave along the measurement line.

After the additional preprocessing provided by scaling and phase corrector 130, the corrected unwrapped phase array $\hat{p}_m$ is input into the system comprised of a Fourier transformer, an array of filters performing a filtered backpropagation technique and another Fourier transformer. The said system and preferred filtered backpropagation technique are identical to that described above with regard to the geophysical embodiments and seen in FIG. 2.

Reconstruction of three-dimensional bodies may also be accomplished according to fixed detector array ultrasonic diffraction tomography systems and methods. Generally, there are two sets of embodiments for reconstructing a three-dimensional profile. The first set of embodiments is derived from an extension of the three-dimensional method and system embodiments disclosed in copending Ser. No. 441,323 and which uses the additional preprocessing and the corrected optimal filtered backpropagation technique disclosed herein with regard to the two-dimensional ultrasonic embodiment. The second set of embodiments, discussed hereinafter, permits three-dimensional reconstructions without the projection of the two-dimensional array onto a line required by the first set of embodiments. It also permits the reconstruction of a section of an object with considerably reduced computer processing time.

Figure 4:
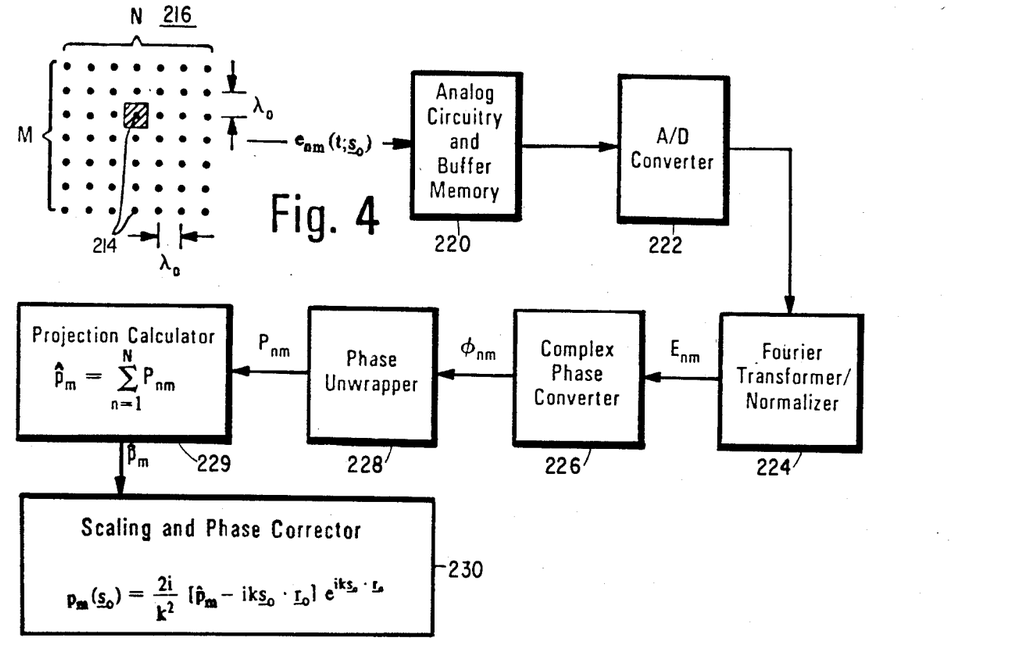
FIG. 4 is a block diagram of the preprocessing performed on detected signals for one embodiment of a fixed detector array ultrasonic diffraction tomography system for three-dimensional reconstructions.

Turning to FIG. 4, a first system for the reconstruction of a three-dimensional object is seen. In the preferred embodiment of this configuration, the detecting system consists of a rectangular NXM array of transducer elements 214 evenly spaced over the detector plane 216. As disclosed in copending Ser. No. 441,323, the centers of the detector elements are separated by a distance on the order of the wavelength $\lambda_0$ corresponding to the center frequency $f_o$ of the insonifying wave. The electrical signals generated by the detector elements are input into the analog electronic circuitry and a buffer storage means 220 which prefilters, calibrates and temporarily stores the analog electrical signals in preparation for the A/D conversion. After A/D conversion at 222, the digitized electrical signals from the transducer elements are used to calculate the two-dimensional unwrapped phase array $P_{nm}$ of the pressure field at the detector locations. Again, as in the case of two-dimensional objects, the preprocessing of the digitized signals can be performed in three different preferred manners.

In one of the preferred manners, the signals are digitized, Fourier transformed in time and normalized at 224 and the principle valued complex phase $\phi_{nm}$ corresponding to each detector location on the detector plane is calculated at 226 in the same manner as $\phi_m$ was calculated in the two-dimensional configuration. After the signals are converted into complex phases $\phi_{nm}$, the two-dimensional array of complex phases are phase unwrapped at 228 to yield the unwrapped phase array $P_{nm}$.

In the case where the pulse duration of the insonifying pulse is very short. The digitized electrical signals $e_{nm}(t;s_0)$ from the detector array are preprocessed so as to yield the delay time $\zeta_{nm}$ and peak amplitude $A_{nm}$ of the received pulses. These quantities are then processed according to the equations $$\text{Real } P_{nm} = \log_e A_{nm}, \tag{15}$$

$$\text{Imag } P_{nm} = \omega_0 \zeta_{nm}. \tag{16}$$

to yield approximate values of the unwrapped complex phase array $P_{nm}$.

A third preferred method applies when the Born approximation is employed. For this case, the complex array $P_{nm}$ is calculated according to the equations $$P_{nm} = e^{-\chi} E_{nm} + \chi - 1 \tag{17}$$

where $\chi$ is the phase of the insonifying plane wave along the measurement plane, and the $P_{nm}$ are then further processed as described below.

Following the calculation of the two-dimensional unwrapped complex phase array $P_{nm}$, this array is projected onto the line formed by the intersection of the detector plane with the plane of rotation of the system. Here, the plane of rotation of the system is defined as the plane formed by the unit propagation vectors $s_0$, all of which are perpendicular to the detection plane. The one-dimensional array representing the projected unwrapped complex phases in the three-dimensional system is denoted by $\hat{p}_m$ and is calculated by summing the unwrapped phase array in column fashion according to $$\hat{p}_m = \sum_{n=1}^{N} P_{nm} \tag{18}$$

as seen at 229. The projection of the two-dimensional array to arrive at the one-dimensional array $\hat{p}_m$ is required in this embodiment to perform either a reconstruction of a three-dimensional object profile or a reconstruction of a two-dimensional planar slice of an object.

After the unwrapped complex phase $P_{nm}$ has been projected at 229 to produce one-dimensional array $\hat{p}_m$, array $\hat{p}_m$ is further preprocessed by scaling and phase corrector 230 which adds angular dependent and constant scaling factors as well as a reference phase subtraction factor, as discussed with regard to the two-dimensional ultrasonic reconstructions disclosed above. Thus, the unwrapped projected complex phase array $\hat{p}_m$ is further preprocessed at 230 according to $$\hat{p}_m = \frac{2i}{k^2} [p_m - iks_o \cdot r_o] e^{-iks_o \cdot r_o} \tag{19}$$

where $-iks_0 \cdot r_0$ is the reference phase subtraction factor ($s_0$ having one free angular component, the other component being fixed by the projection plane, such that $s_0$ lies in the plane of rotation of the system as previously defined and is perpendicular to the detection plane), and where $e^{iks_0 \cdot r_0}$ is the angular dependent scaling factor while $2i/k^2$ is a constant scaling factor at wavenumber k. Again, as disclosed above, scaling and phase corrector 230 accounts for the fact that the fixed detector array is not coplanar to the plane wave emanating from the source.

After the unwrapped projected complex phase has been corrected by scaling and phase corrector 230, the resulting $p_m$ array may be processed by a Fourier transformer, a filtered backpropagation technique and a Fourier transformer to arrive at a partial reconstruction of the object. The preferred filtered backpropagation technique is identical to that disclosed above with regard to both the two-dimensional ultrasonic diffraction tomography system embodiments and the geophysical embodiments, and as seen in FIG. 2.

Figure 6:
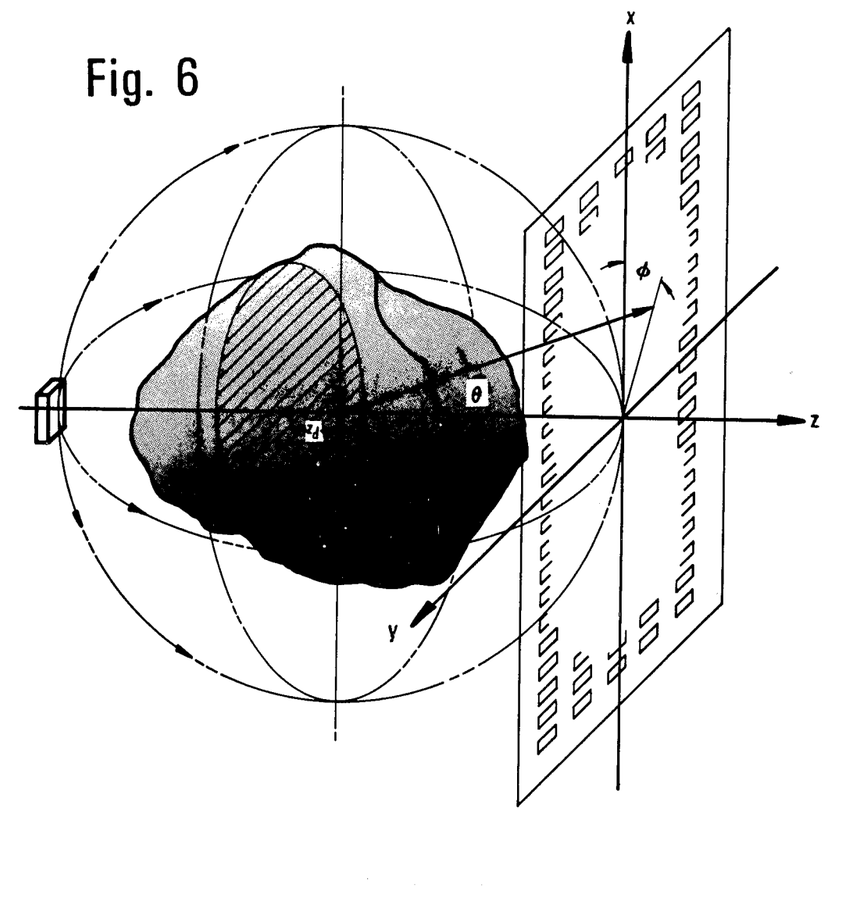
FIG. 6 is a schematic showing the planes and angles which are used to define some of the preprocessing of the fixed detector array diffraction tomography three-dimensional reconstruction systems.

By repeating the entire sequence of operations for a new view angle ($\theta_0$) and adding the resulting array onto a master array, a partial reconstruction of the planar projection of the object will be obtained. (The plane of projection will be the plane of rotation of the system.) By repeating this for a number of view angles ($\theta_0$), (as seen in FIG. 6), a complete rendition of the planar projection of the object will be generated. The planar angle or orientation ($\phi_0$) can then be changed and the entire sequence repeated to obtain a projection of the object onto a new plane. In this way, any number of planar projections can be obtained from which a complete three-dimensional rendition of a three-dimensional object can be generated using known 3-D tomographic reconstruction techniques. The real and imaginary parts of the three-dimensional profile can then be displayed either separately or jointly using known three-dimensional display methods.

It is sometimes desirable to display sections (planar slices) of objects such as biological media rather than planar projections of such media. Sections can be reconstructed from a sufficient number of planar projections by means of the three-dimensional projection slice theorem discussed in copending U.S. Ser. No. 441,323. In the present invention, the planar projections of the three-dimensional object profiles as generated by the filtered backpropagation technique can be used in conjunction with the three-dimensional projection-slice theorem to yield planar sections of the object profile of the three-dimensional body being examined.

As aforementioned, a second set of embodiments have been generated to permit three-dimensional reconstruction of an object without the projection of the two-dimensional $P_{nm}$ array along a line. Additionally, these best mode embodiments permit the efficient generation of two-dimensional section (slice) reconstructions of a three-dimensional object such that real time slice reconstructions are more readily accomplished.

Figure 5:
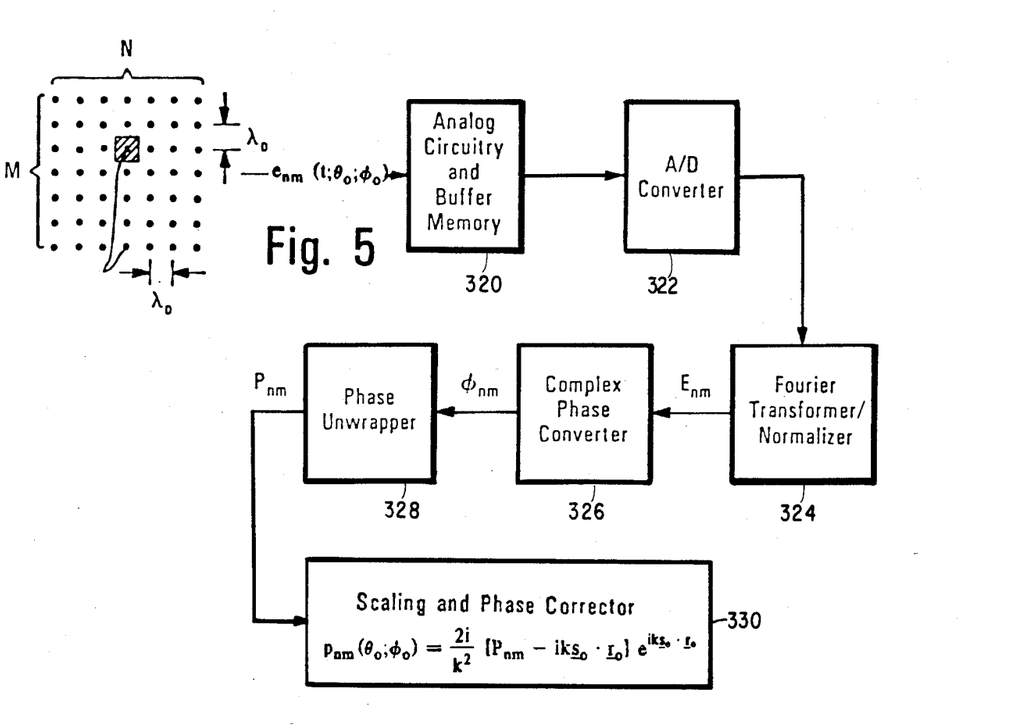
FIG. 5 is a block diagram of the preprocessing performed on detected signals for the preferred embodiment of a fixed detector array diffraction tomography system for three-dimensional reconstruction and two-dimensional section reconstructions.

According to the invention, the time dependent waveforms are measured on the fixed two-dimensional receiver array. As seen in FIG. 5, the measured signals $e_{nm}(t;s_0)$ are input into the analog electronic circuitry and buffer storage system 320 which prefilters, calibrates and temporarily stores the analog electrical system. After A/D conversion at 322, the digitized signals are Fourier transformed and normalized at 324 to generate $E_{nm}$ and if the Rytov approximation for scattering is used, the two-dimensional $E_{nm}$ array is complex phase converted at 326 and phase unwrapped at 328, as described in copending Ser. No. 441,323, to yield $P_{nm}$. If the Born approximation is utilized, the complex array $P_{nm}$ is calculated as in Equation 16 above. Of course, the short pulse duration embodiment discussed above with regard to the other three-dimensional reconstruction technique may also be employed. Unwrapped complex two-dimensional phase array $P_{nm}$ is then further preprocessed by scaling and phase corrector 330 according to $$p_{nm} = \frac{2i}{k^2} [P_{nm} - iks_o \cdot r_o] e^{-iks_o \cdot r_o} \quad (20)$$

where $$s_0 = (\sin \theta_0 \cos \phi_0 \sin \theta_0 \cos \theta_0) \quad (21)$$

and where $\phi_0$ and $\theta_0$ are formed relative to the z and x axes as illustrated in FIG. 6. It should be clear to those skilled in the art that scaling and phase corrector 330 is equivalent to the other scaling and phase correctors used in the other embodiments herein, except that $s_0$ is a vector for a solid angle. Thus, $s_o$ has two degrees of freedom and is not restricted to lie in a plane of rotation of the system because the two-dimensional unwrapped phase array is not projected. Thus, the resulting array $p_{nm}$ is a two-dimensional array which is input into filtering system 350.

Figure 7:
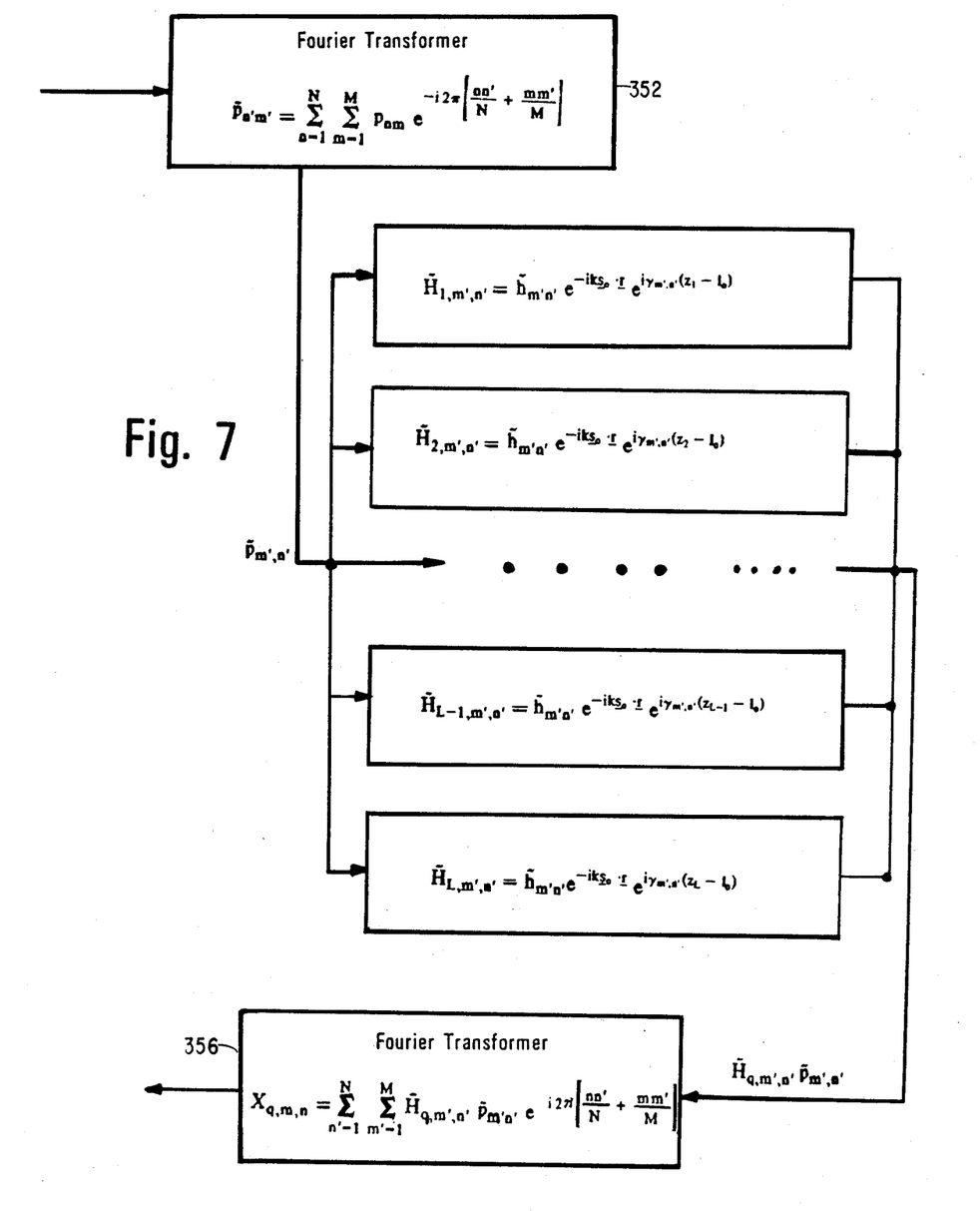
FIG. 7 is a block diagram of the preferred filtered backpropagation technique for the preferred fixed detector array diffraction tomographic system for three-dimensional reconstructions and two-dimensional section reconstructions.

System 350, as seen in FIG. 7, includes a two-dimensional Fourier transformer 352, an array of filters 354 and an inverse two-dimensional Fourier transformer 354. The two-dimensional array $p_{nm}$ is Fourier transformed at 352 according to $$\tilde{p}_{n'm'} = \sum_{n=1}^{N} \sum_{m=1}^{M} p_{nm} e^{-i2\pi[\frac{nn'}{N} + \frac{mm'}{M}]} \quad (22)$$

and the resulting two-dimensional array $\tilde{p}_{n'm'}$ is processed according to the filtered backpropagation technique $$\tilde{H}_{q,m',n'} = \tilde{h}_{m',n'}(s_0) e^{-iks_o \cdot r} e^{i\gamma_{m',n'}(z_q - l_o)} \quad (23)$$

where $\tilde{h}_{m'n'}(s_0) = \tilde{h}(K, S_0)$ is a deblurring filter with $s_0$ defined by equation 21, and $h(K;s_0) = \{ks - ks_0\}$; (24)

$$s_o \cdot r = \sin \theta_o \cos \phi_o x + \sin \theta_o \sin \phi_o y + \cos \theta_o z \quad (25)$$

$$ks = K_{\hat{x}}x + K_y\hat{y} + \gamma\hat{z} \quad (26)$$

$$K = K_y\hat{y} + K_x\hat{x} \quad (27)$$

$$\gamma_{m',n'} = \sqrt{k^2 - K^2} \quad (28)$$

and where $K_x = kn'/N$ and $K_y = km'/M$. The filter $\tilde{h}(K,s_0)$ as defined in relationship (24), however, is only optimal in the forward scattering mode. Thus, as disclosed above with regard to the geophysical embodiments, the filter $\tilde{h}(K;s_0)$ must be changed in the backscatter mode in order to be optimal.

The second filter of the filtered backpropagation technique is a backpropagation filter. The preferred backpropagation filter $e^{-iks_o \cdot r} e^{i\gamma_{m',n'}(z_q - l_o)}$ differs from that disclosed with regard to the two-dimensional ultrasonic backpropagation filter disclosed herein, in that it is a function of $s_0 \cdot r$ which depends upon both x and y (see Equation 25), rather than just on y. However, it is still a non-stationary filter in that it is a function of the depth of the reconstruction $z - l_o$.

After the Fourier transformed array $\tilde{p}_{n'm'}$ is filtered according to the filtered backpropagation technique for stationary detecting arrays, the resulting two-dimensional array is inverse Fourier transformed by a two-dimensional Fourier transformer at 356 to provide a partial reconstruction of the three-dimensional object which may be transferred onto a master array and displayed. By preprocessing and filtering the information received and output by the detector-transducers for a number of incident angles ($\theta_0$) and a number of planar angles ($\phi_0$) as suggested by FIG. 6, numerous partial reconstructions of the three-dimensional object may be obtained and transferred onto the master array. Using computer graphic techniques which are well known in the art, the three-dimensional reconstruction may be displayed, and the real and imaginary parts of the reconstruction may be displayed either jointly or separately, as desired.

Using this preferred above-described second approach to the reconstruction of three-dimensional objects, a section or slice of the object along a plane may more easily be reconstructed. If the information produced at different incident and planar angles is received by the fixed detectors and is then preprocessed and then filtered by a single backpropagation filter (rather than a filter bank) at a given depth $z_q - l_o$, a slice over the specific plane $z = z_q$ will be reconstructed. While the time required for carrying out the tomographic procedures of moving the source to provide numerous angles of incidence and planar angles will not be reduced by such a technique, the processing time for the detected information will be shortened considerably, easily permitting real-time processing which might have been difficult to obtain otherwise.

Again, as with the geophysical fixed array diffraction tomography systems and methods, those skilled in the art will appreciate that the ultrasonic fixed array diffraction tomography systems and methods are closely related and that numerous permutations and variations may be made to the invention disclosed herein while still being within the scope and spirit of the invention. For example, while the ultrasonic embodiments have been discribed as using plane wave sources, cylindrical waves may be used and the detected signals similarly preprocessed. Thus, the embodiments described herein are intended to be by way of example only and are not intended to limit the invention in any manner.

BACKSCATTER FIXED DETECTOR ARRAY DIFFRACTION TOMOGRAPHY

Figure 8:
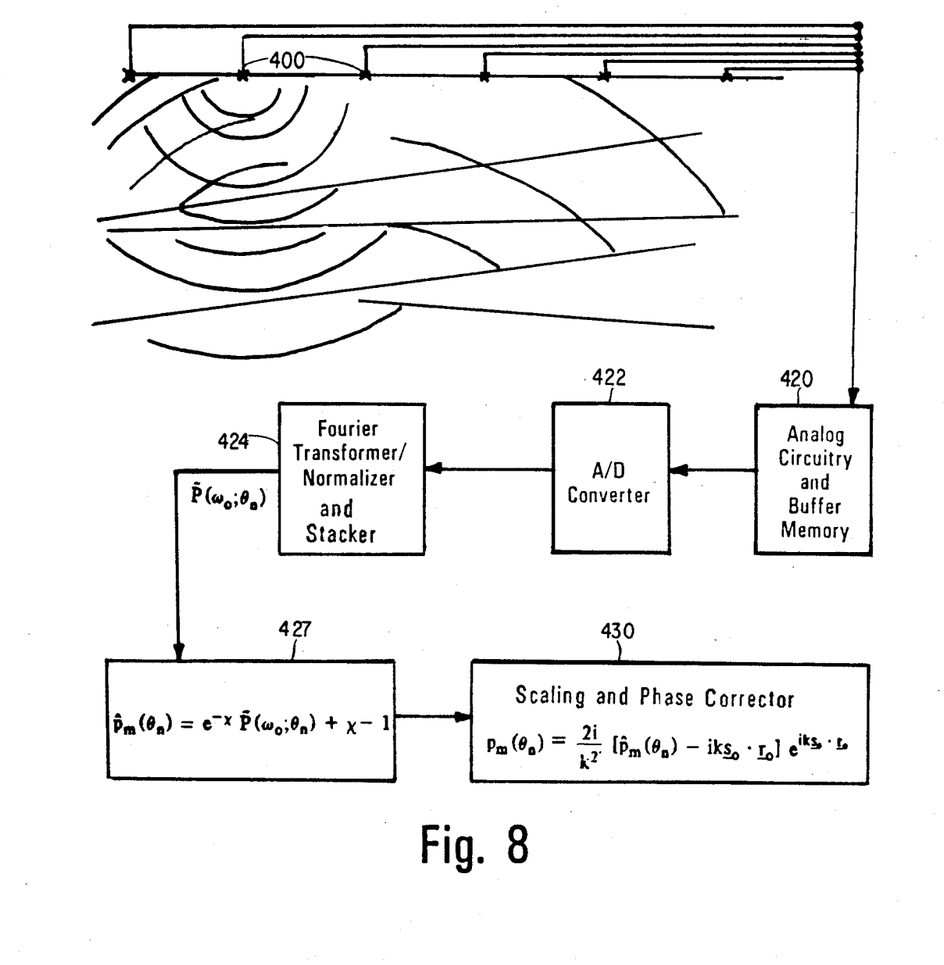
FIG. 8 is a partially schematic and partially block diagram of the backscatter embodiments of a fixed detector array diffraction tomography system.

The same techniques used in the geophysical diffraction tomography and two- and three-dimensional ultrasound tomography embodiments disclosed herein apply to backscatter fixed detector array tomographic systems and methods. Backscatter refers to the situation where the incident wave propagates from the same half-space that contains the detector array. As seen in FIG. 8, in the geophysical diffraction tomography backscatter mode, the acoustic or electromagnetic sources and detectors 400 can be located on the same line, (for a two-dimensional reconstruction) or plane (for a three-dimensional reconstruction) if the system constraints allow. Indeed, by definition then, the backscatter embodiments are simply special cases of the other fixed detector array embodiments disclosed hereinbefore. Therefore, the backscatter cases will not be discussed in as much detail.

Backscatter fixed detector array tomography can be viewed as most akin to the geophysical embodiments disclosed herein because in standard backscatter situations (such as the pulse-echo mode), as in geophysics, not only is the detector array fixed in space, but so is the source. Those skilled in the art should appreciate that using the techniques disclosed above for the ultrasonic diffraction tomography embodiments in conjunction with the techniques disclosed hereinafter, backscatter ultrasonic diffraction tomography can also be accomplished.

Because as aforementioned, backscatter is a special case of the other embodiments disclosed herein, the preprocessing and filtered backpropagation technique required are identical in almost all respects to those used in the other embodiments herein. The one main difference concerns the derivation of the unwrapped complex phase. Thus, according to the best mode of the backscatter diffraction tomography embodiments, the unwrapped complex phase array $\hat{p}_m(\theta_n)$ is derived from array $\tilde{P}_m(\omega_o,\theta_n)$ (after storage at 420, conversion at 422, and Fourier transformation and normalization at 424) via the Born scattering approximation such that $$p_m(\theta_n) = e - \chi \tilde{P}_m(\omega_o\theta_n) + \chi - 1 \qquad (29)$$

For the plane wave embodiments, equation 14 may be substituted. It is believed that in the backscatter mode, the Born approximation provides the most accurate model for reconstruction via diffraction tomography techniques. Those skilled in the art will appreciate, however, that the unwrapped complex phase array may be determined using the Rytov first scattering approximation or the approximations used when the pulse duration is very short as previously described.

.Another difference concerns the angles of incidence of the insonifying waves. In backscatter, the angles of incidence will always range from $-\pi \leq \theta \leq 0$. Thus, after the complex unwrapped phase is scaled and phase converted at 430, the resulting array will be filtered according to the filtered backpropagation technique which optimally will be altered, as the convolutional filter must change as described in (9) when $-\pi \leq \theta \leq -\pi/2$.

For three-dimensional backscatter ultrasonic diffraction tomography systems, a two-dimensional array of transducers fixed on a plane would be required. The two-dimensional array of transducers may be pulsed with phase delays such that a plane wave may be approximated. Again, the exact preprocessing and filtering disclosed with regard to ultrasonic three-dimensional embodiments disclosed herein may be used, except that the Born approximation is preferred and the filtered backpropagation technique is optimized for backscatter. Thus, the convolutional filter is optimized for incident wavevector angles of $\pi/2 \leq \theta \leq \pi$ for all $\phi$, where $\theta$ and $\phi$ are as shown in FIG. 6. Of course, the three-dimensional reconstruction and slices thereof obtained by these disclosed backscatter techniques will not be as complete as those disclosed with regard to the fixed array tomography techniques disclosed above.

Those skilled in the art will recognize that numerous permutations and variations may be made to the backscatter fixed detector array diffraction tomography system and method inventions which are closely related as disclosed herein while still being within the scope and spirit of the invention.

I claim:

1. A method for the tomographic reconstruction of a subsurface geological formation which has diffracted at least one wave of energy interacting with it, comprising the steps of:
(a) obtaining one or more signals which are a function of at least one of the phase and amplitude of the diffracted propagating wave after said wave has interacted with said formation;
(b) preprocessing said obtained signals, wherein said preprocessing includes the step of scaling and phase correcting signals; and
(c) converting said preprocessed signals by means of a filtered backpropagation technique into an array representing the partial reconstruction profile of the formation.

2. A method according to claim 1 further comprising:
(d) displaying said reconstruction profile of the formation.

3. A method according to claim 1 wherein said preprocessing step further comprises:
converting said one or more obtained signals from analog to digital form;
transforming said digital signal over time with a Fourier transform;
normalizing said transformed signals;
complex phase converting said normalized signals;
phase unwrapping said complex phase converted signals for input into said scaling and phase correcting step.

4. A method for the tomographic reconstruction of a subsurface geological formation comprising:
(a) directing at a phase tilt one or more waves of energy toward said geological formation;
(b) detecting as a function of time, the one or more fields produced by said one or more waves;
(c) producing one or more signals which are functions of said one or more detected fields;
(d) preprocessing said produced signals wherein said preprocessing includes the step of scaling and phase correcting signals; and
(e) filtering said scaled and phase corrected preprocessed signals according to a filtered backpropagation technique to generate a two-dimensional array representing the partial reconstruction of said geological formation.

5. A method according to claim 4 further comprising:

(f) interpolating said partial reconstruction onto a master array;

(g) changing said phase tilt; and (h) repeating steps a-g at different view angles to obtain a two-dimensional reconstruction of said formation.

6. A method according to claim 5 further comprising:

(i) displaying said two-dimensional reconstruction of said formation.

7. A method according to claim 5 wherein said preprocessing step further comprises:

converting said one or more produced signals from analog to digital form;

transforming said digital signal over time with a Fourier transform;

normalizing said transformed signals;

complex phase converting said normalized signals;

phase unwrapping said complex phase converted signals for input into said scaling and phase correcting step.

8. A method according to claim 4 wherein:

said preprocessed signals are filtered and backpropagated according to a filtered backpropagation technique $$\widetilde{H}_{q,m} = \widetilde{h}_m e^{iks_0 \cdot r_e} e^{i\gamma_m(z_q - l_o)}$$

wherein $\widetilde{H}_{q,m}$ is a filtered backpropagation technique for object depth $z_q$, and m indexes sample values of preprocessed signals;

$\widetilde{h}_m$ is a filter which equals the absolute value of $$k \frac{m}{M} \cos \theta_n - \gamma_m \sin \theta_n$$

$$\gamma_m = k \sqrt{1 - \left(\frac{m}{M}\right)^2}$$

where M is the number of detectors detecting said fields;

k is the wavenumber associated with the dominant frequency of said waves;

$z_q$ is the distance of the investigated object depth q from the axis of rotation of said object; and $l_o$ is the distance between the axis of rotation of said object and the detector array. $s_0 \cdot r$ is a scalar product between the unit propagation vector $s_0$ and the position vector r; and $\theta_n$ is the phase tilt of said directed waves of energy.

9. A method according to claim 8 wherein:

said filter $\widetilde{h}_m$ is changed to equal $$\left| k \frac{m}{M} \cos \theta_n - \gamma_m \sin \theta_n \right| \left[ 1 - S\left(k \frac{m}{M} - k \sin \theta_n\right) \right]$$

when $-\pi \leq \theta_o \leq -\pi/2$, wherein S is a step function.

10. A method according to claim 9 wherein:

said directing and detecting steps are accomplished by sources and receivers located along an identical line.

11. A method according to claim 4 wherein:

said directing and said detecting steps are accomplished by sources and receivers located along an identical line.

12. A method for the reconstruction of a three-dimensional object which has diffracted waves of energy propagating through it at at least one view angle on a plane for at least one planar orientation, comprising the steps of:

(a) obtaining signals which are a function of at least one of the phase and amplitude of each propagating wave after said wave has interacted with said object;

(b) preprocessing and separating said obtained signals to obtain sets of preprocessed signals, each set representing the signals obtained from the propagation of an energy wave at a separate view angle, said preprocessing and separating including the step of scaling and phase correcting signals.

(c) converting said sets of preprocessed signals by means of a filtered backpropagation technique into arrays representing the partial reconstruction of the object; and (d) interpolating each partial reconstruction onto a master array to obtain a two-dimensional reconstruction of a planar projection of the object.

13. A method according to claim 12 further comprising:

(e) additionally separating said obtained signals into second sets of signals, each second set of signals representing the signals obtained from the propagation of an energy wave at a separate planar orientation, whereby by said converting step, the two-dimensional planar projected reconstruction is for each planar orientation, and a three-dimensional reconstruction of the object can be obtained from a plurality of said two-dimensional planar projection reconstructions.

14. A method for tomographic reconstruction of a three-dimensional object comprising:

(a) directing at a view angle on a plane one or more waves of energy toward an object being examined;

(b) detecting as a function of time the one or more fields produced by said one or more waves;

(c) producing one or more signals which are functions of said one or more detected fields;

(d) preprocessing said produced signals wherein said preprocessing includes the step of scaling and phase correcting signals; and (e) filtering said preprocessed signals according to a filtered backpropagation technique to generate a two-dimensional array representing the partial reconstruction of the object.

15. A method according to claim 14 further comprising:

(f) adding said partial reconstruction array onto a master array;

(g) changing said view angle on said plane; and (h) repeating steps a-g at different view angles on said plane to obtain a two-dimensional reconstruction of a planar projection of the object.

16. A method according to claim 15 further comprising:

(i) changing said plane on which said waves of energy are directed at a view angle; and (j) repeating steps a-i at a sufficient number of different planar orientations to obtain a plurality of planar projections of the three-dimensional object profile from which a full three-dimensional reconstruction of the object profile can be obtained.

17. A method according to claim 16 further comprising:

displaying said planar projection of the three-dimensional reconstruction of the object.

18. A method according to claim 14 wherein said preprocessing step further comprises:

converting said produced signal from analog to digital form;

transforming said digital signals over time with a Fourier transform;

normalizing said transformed signals;

complex phase converting said normalized signals;

phase unwrapping said complex phase converted signals; and projecting a two-dimensional array of complex phase converted signals onto the line formed by the intersection of the detecting plane with the plane of rotation of the directing-detecting system to produce a one-dimensional array for input into said filtering step.

19. A method according to claim 18 wherein:

said directing and said detecting steps are accomplished by two-dimensional arrays of sources and receivers located in the same plane.

20. A method according to claim 14 wherein said preprocessed signals are filtered and backpropagated according to a filtered backpropagation technique $$\tilde{H}_{q,m} = \tilde{h}_m e^{iks_0 \cdot r} e^{i\gamma_{m,n}(z-l_0)}$$

wherein $H_{q,m}$ is a filtered backpropagation technique for object depth $z_q$, and m indexes sample values of preprocessed signals;

$\tilde{h}_m$ is a filter which equals the absolute value of $$k\frac{m}{M}\cos\theta_n - \gamma_m \sin\theta_n$$

$$\gamma_m = k\sqrt{1 - \left(\frac{m}{M}\right)^2}$$

where M is the number of detectors detecting said fields;

k is the wavenumber associated with the dominant frequency of said waves;

$z_q$ is the distance of the investigated object depth q from the axis of rotation of said object;

$1_o$ is the distance between the axis of rotation of said object and the detector array; and $s_0 \cdot r$ is a scalar product between the unit propagation vector $s_0$ and the position vector r, wherein $s_0$ has one degree of freedom.

21. A method for tomographic reconstruction of a three-dimensional object comprising:

(a) directing at a view angle on a plane one or more waves of energy toward an object being examined;

(b) detecting as a function of time the one or more fields produced by said one or more waves;

(c) producing one or more signals which are functions of said one or more detected fields;

(d) preprocessing said produced signals wherein said preprocessing includes, converting said produced signal from analog to digital form;

transforming said digital signals over time with a Fourier transform;

normalizing said transformed signals;

complex phase converting said normalized signals;

phase unwrapping said complex phase converted signals scaling and phase correcting said phase unwrapped signals;

(e) filtering said preprocessed signals according to a filtered backpropagation technique;

(f) changing said view angle on said plane;

(g) changing said plane on which said waves of energy are directed at a view angle; and (h) repeating steps a-g at a sufficient number of different planar orientations such that a full three-dimensional reconstruction of the object profile can be obtained.

22. A method according to claim 21 wherein:

said preprocessed signals are filtered and backpropagated according to a filtered backpropagation technique $$\tilde{H}_{q,m,n} = \tilde{h}_{m,n}(S_o) e^{-iks_0 \cdot r} e^{i\gamma_{m,n}(z-l_0)}$$

wherein $\tilde{H}_{q,m,n}$ is a filtered backpropagation technique for object depth $z_q$, and n and m index sample values of preprocessed signals;

$h_{m,n}$ is a deblurring filter;

$$\gamma_m = k\sqrt{1 - \left(\frac{m}{M}\right)^2 - \left(\frac{n}{N}\right)^2}$$

where M and N are the number of detector rows and columns used in detecting said wave;

k is the wavenumber associated with the frequency of said directed waves;

$z_q$ is the distance of the investigated object depth q from the axis of rotation of said object; and $1_o$ is the distance between the axis of rotation of said object and the detector array.

$s_0$ r is a scalar product between the unit propagation vector $s_0 = \sin\theta_0\cos\phi_0\sin\theta_0\sin\phi_0\cos\theta_0$) and the position vector r, wherein $s_0$ has two degrees of freedom;

$\theta_n$ is the view angle; and $\phi_0$ is the planar orientation.

23. A method according to claim 22 wherein:

a planar section of said object is reconstructed at a given depth by setting $z_q$ of said filtered backpropagation technique equal to said given depth.

24. A method according to claim 21 wherein:

said directing and said detecting steps are accomplished by two-dimensional arrays of sources and receivers located in the same plane.

25. A system for the tomographic reconstruction of a subsurface geological formation which has diffracted at least one wave of energy interacting with it comprising:

(a) obtaining means for obtaining one or more signals which are a function of at least one of the phase and amplitude of the diffracted propagating wave after said wave has interacted with said formation;

(b) preprocessing means for preprocessing said signals obtained by said obtaining means, wherein said preprocessing means includes means for scaling and phase correcting signals; and (c) filtering means for converting said preprocessed signals by means of a filtered backpropagation technique into an array representing the partial reconstruction profile of the formation.

26. A system for the tomographic reconstruction of a subsurface geological formation comprising:

source means for directing at a phase-tilt one or more waves of energy toward said geological formation;

(b) detecting means for detecting as a function of time, the one or more fields produced by said one or more waves and for producing one or more signals which are functions of said one or more fields wherein said detecting means is located on the same line as said source means;

(c) preprocessing means for preprocessing said produced signals wherein said preprocessing means includes means for scaling and phase correcting signals; and (d) filtering means for filtering said scaled and phase corrected preprocessed signals according to a filtered backpropagation technique to generate a two-dimensional array representing the partial reconstruction of said geological formation.

27. A system for tomographic reconstruction of a three-dimensional object comprising:

(a) source means for directing at a view angle on a plane one or more waves of energy directed toward an object being examined;

(b) detecting means for detecting as a function of time the one or more fields produced by said one or more waves, and producing one or more signals which are functions of said one or more fields;

(c) converting means for correcting said produced signals from analog to digital form;

(d) transforming means for Fourier transforming said digital signals over time;

(e) normalizing means for normalizing said transformed signals;

(f) complex phase converting means for complex phase converting said normalized signals;

(g) phase unwrapping means for phase unwrapping said complex phase converted signals to produce a two-dimensional array;

(h) scaling and phase converting means for scaling and phase converting said phase unwrapped signals;

(i) filtering means for filtering said scaled and phase converted signals according to a filtered backpropagation technique $$\widetilde{H}_{q,m,n} = \widetilde{h}^{m,n}(S_o)e_{-iks_o \cdot r}e^{i\gamma_{m,n}(z-l_o)}$$

wherein $\widetilde{H}_{q,m,n}$ is a filtered backpropagation technique for object depth $z_q$, and n and m index sample values of preprocessed signals;

$\widetilde{h}_{m,n}$ is a deblurring filter;

$$\gamma_m = k\sqrt{1 - \left(\frac{m}{M}\right)^2 - \left(\frac{n}{N}\right)^2}$$

where M and N are the number of detector rows and columns used in detecting said wave;

k is the wavenumber associated with the frequency of said directed waves;

$z_q$ is the distance of the investigated object depth q from the axis of rotation of said object; and $l_o$ is the distance between the axis of rotation of said object and the detector array.

$s_0 \cdot r$ is a scalar product between the unit propagation vector $s_0 = \sin\theta_0\cos\phi_0\sin\theta_0\sin\phi_0\cos\theta_0$) and the position vector r;

$\theta_n$ is the view angle; and $\phi_n$ is the planar orientation.

28. A system according to claim 27 wherein: said source means and detecting means are co-planar.

* * * * *